(12) United States Patent
Ehlen

(10) Patent No.: US 10,133,319 B2
(45) Date of Patent: Nov. 20, 2018

(54) MEMORY DRIVE ADAPTERS AND RETAINERS

(71) Applicant: Facebook, Inc., Menlo Park, CA (US)

(72) Inventor: Jon Brian Ehlen, Newark, CA (US)

(73) Assignee: Facebook, Inc., Menlo Park, CA (US)

( * ) Notice: Subject to any disclaimer, the term of this patent is extended or adjusted under 35 U.S.C. 154(b) by 59 days.

(21) Appl. No.: 15/154,388

(22) Filed: May 13, 2016

(65) Prior Publication Data

US 2017/0329373 A1  Nov. 16, 2017

(51) Int. Cl.
*G06F 1/16* (2006.01)
*H05K 5/00* (2006.01)
*H05K 7/00* (2006.01)
*G06F 1/18* (2006.01)
*G11B 33/12* (2006.01)

(52) U.S. Cl.
CPC ............ *G06F 1/187* (2013.01); *G11B 33/124* (2013.01)

(58) Field of Classification Search
CPC . G06F 1/18; G06F 1/183; G06F 1/187; G11B 33/123; G11B 33/124; G11B 33/122; G11B 33/121
USPC ........................ 361/679.33–679.39, 724–727, 361/679.31–679.39
See application file for complete search history.

(56) References Cited

U.S. PATENT DOCUMENTS

| 5,553,412 A | 9/1996 | Briechle et al. |
| 5,886,869 A | 3/1999 | Fussell et al. |
| 6,040,980 A | 3/2000 | Johnson et al. |
| 6,236,563 B1 | 5/2001 | Buican et al. |
| 6,317,334 B1 * | 11/2001 | Abruzzini ............ G11B 33/126 361/679.33 |
| 7,009,838 B2 | 3/2006 | Roh et al. |
| 8,462,495 B1 | 6/2013 | Keefe et al. |
| 8,743,536 B2 * | 6/2014 | Alo ......................... G06F 1/187 361/679.33 |
| 9,552,024 B2 | 1/2017 | Lin et al. |
| 9,691,435 B2 | 6/2017 | Ehlen |
| 2002/0050552 A1 | 5/2002 | Reznikov et al. |
| 2005/0030721 A1 * | 2/2005 | Shimada ................. G06F 1/181 361/726 |

(Continued)

OTHER PUBLICATIONS

Restriction Requirement dated Dec. 1, 2016, for U.S. Appl. No. 14/679,761 by Ehlen, J., et al., filed Apr. 6, 2015.

(Continued)

*Primary Examiner* — Anthony Haughton
(74) *Attorney, Agent, or Firm* — FisherBroyles, LLP

(57) ABSTRACT

Technology is provided for a pivoting memory drive adapter. The memory drive adapter is used for adapting memory drives for insertion into a drive bay that is larger than the memory drives. The memory drive adapter includes an adapter frame and a memory carrier. The adapter frame has an envelope compatible with a hard disc drive (HDD) drive bay, for example, and includes a pair of spaced apart sidewalls each including a slot. The memory carrier includes a pair of pins extending from opposite sides of the memory carrier engaging a corresponding one of the pair of slots. Thus, the memory carrier can pivot with respect to the adapter frame. A pair of spaced apart ledges divides the memory carrier into two memory drive locations, each sized to receive a memory drive, such as a solid state drive (SSD).

17 Claims, 8 Drawing Sheets

(56) References Cited

U.S. PATENT DOCUMENTS

| | | |
|---|---|---|
| 2005/0257232 A1* | 11/2005 | Hidaka ................ G11B 33/126 720/654 |
| 2006/0061954 A1 | 3/2006 | Lam et al. |
| 2006/0292918 A1 | 12/2006 | Behl et al. |
| 2007/0105419 A1 | 5/2007 | Chen et al. |
| 2013/0127310 A1 | 5/2013 | Yu et al. |
| 2013/0201626 A1 | 8/2013 | Bondurant et al. |
| 2014/0205394 A1 | 7/2014 | Chao et al. |
| 2015/0382499 A1 | 12/2015 | Chiasson et al. |
| 2016/0293223 A1 | 10/2016 | Ehlen et al. |
| 2016/0293224 A1 | 10/2016 | Ehlen et al. |

OTHER PUBLICATIONS

Non-Final Office Action dated Nov. 25, 2016, for U.S. Appl. No. 14/679,789 by Ehlen, J., et al., filed Apr. 6, 2015.
Restriction Requirement dated Jul. 6, 2016, for U.S. Appl. No. 14/679,789 by Ehlen, J., et al., filed Apr. 6, 2015.
U.S. Appl. No. 14/679,761 of Ehlen, Jon Brian, filed Apr. 6, 2015.
U.S. Appl. No. 14/679,789 by Ehlen, J., et al., filed Apr. 6, 2015.
Non-Final Office Action dated Apr. 20, 2017, for U.S. Appl. No. 14/679,761 by Ehlen, J., filed Apr. 6, 2015.
Notice of Allowance dated Apr. 10, 2017, for U.S. Appl. No. 14/679,789 by Ehlen, J., et al., filed Apr. 6, 2015.
Final Office Action dated Dec. 22, 2017 for U.S. Appl. No. 14/679,761 by Ehlen, J., et al., filed Apr. 6, 2015.

* cited by examiner

MEMORY DRIVE ADAPTERS AND RETAINERS

TECHNICAL FIELD

This patent application is directed to data storage server configurations and, more specifically, to memory drive adapters and retainers.

BACKGROUND

Traditional memory drive storage trays include individual covers to retain the memory drives in their corresponding drive bays. However, these covers can make servicing the memory drives more difficult. The drive bays of memory drive storage trays are usually configured to accept one type and size of memory drive, such as a 3.5 inch hard disc drive (HDD). However, in the course of maintaining and upgrading data storage servers, it may be desirable to change the memory drive type and/or size. For example, in some cases, it may be desirable to replace a 3.5 inch HDD with one or more 2.5 inch solid state drives (SSD).

BRIEF DESCRIPTION OF THE DRAWINGS

Embodiments of the memory drive adapters and retainers introduced herein may be better understood by referring to the following Detailed Description in conjunction with the accompanying drawings, in which like reference numerals indicate identical or functionally similar elements.

Figure 1:
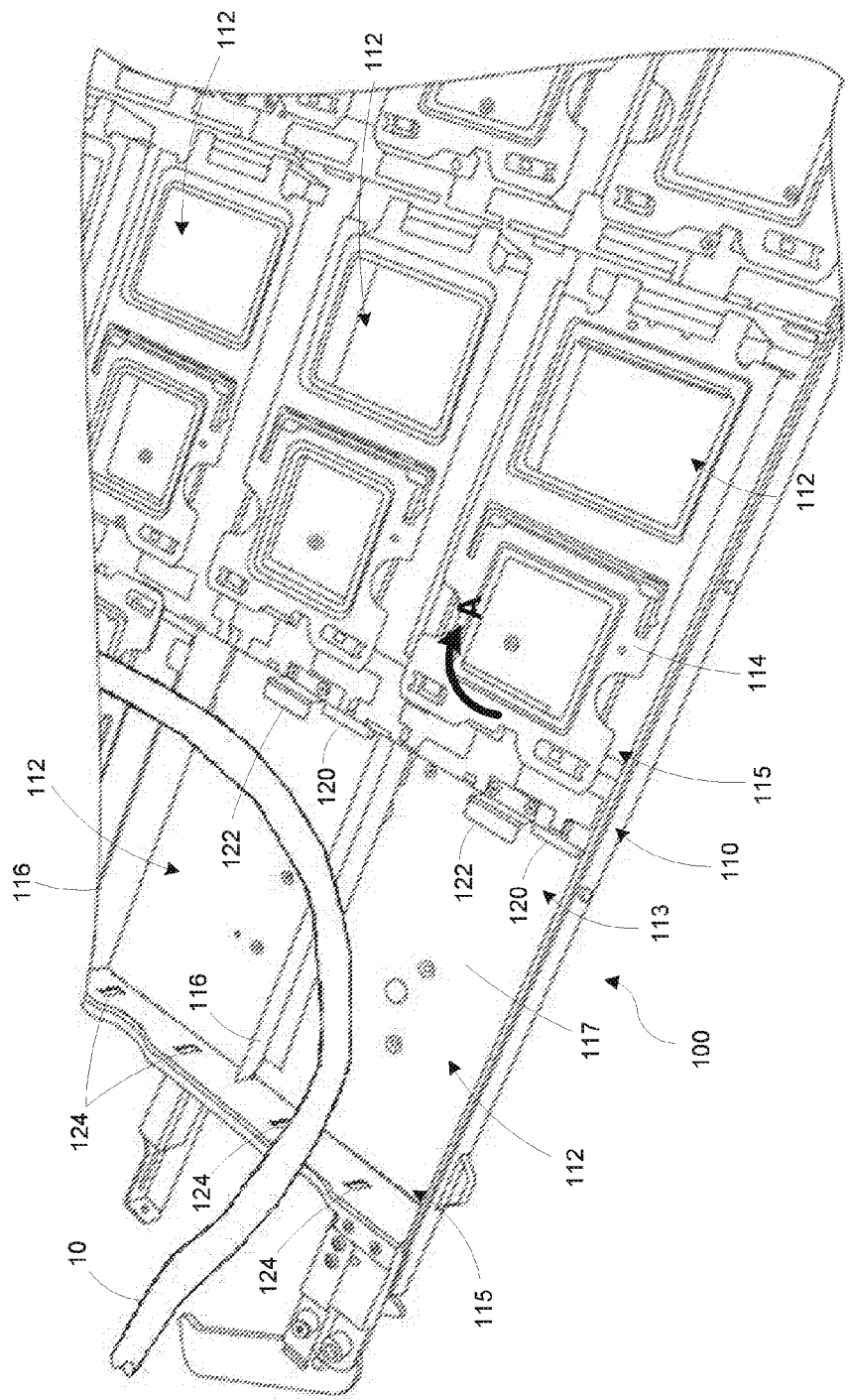
FIG. 1 is a partial perspective view of a memory drive storage tray according to a representative embodiment.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

A pivoting memory drive adapter is disclosed. In an embodiment, the memory drive adapter is used for adapting memory drives for insertion into a drive bay that is larger than the memory drives. The memory drive adapter includes an adapter frame and a memory carrier sized and configured to fit in the adapter frame. The adapter frame has an envelope compatible with a hard disc drive (HDD) drive bay, for example, and a pair of spaced apart sidewalls each including a slot. The memory carrier includes a pair of pins extending from opposite sides of the memory carrier. Each pin is configured to engage a corresponding one of the pair of slots, and the memory carrier can pivot with respect to the adapter frame. A pair of spaced apart ledges divides the memory carrier into two memory drive locations, each sized to receive a memory drive, such as a solid state drive (SSD). A pair of memory drive connectors are each positioned adjacent a corresponding memory drive location and an adapter connector is electrically coupled to the pair of memory drive connectors. The adapter connector is positioned on the adapter frame for connection with an associated drive bay connector of the drive bay.

A memory drive adapter in accordance with another embodiment is used for adapting memory drives for insertion into a drive bay (e.g., HDD) that is larger than the memory drives. The memory drive adapter includes an adapter frame having an envelope compatible with the drive bay. A pair of spaced apart ledges are connected to the frame so as to define two memory drive locations. Each memory drive location is sized to receive a memory drive, such as an SSD. A pair of memory drive connectors are each positioned adjacent a corresponding memory drive location. An adapter connector is electrically coupled to the pair of memory drive connectors and positioned on the adapter frame for connection with an associated drive bay connector of the drive bay.

A hard disc drive (HDD) retainer for retaining a HDD in a drive bay is also disclosed. The HDD retainer includes a spacer body configured to confront an end of a HDD. One or more spring arms extends from the spacer body and is operative to maintain a force against the HDD thereby urging the HDD toward a drive bay connector associated with the drive bay. In some embodiments, at least one tab is disposed on the one or more spring arms for engaging a sidewall of the drive bay opposite the drive bay connector.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 illustrates a memory drive storage tray 100 according to a representative embodiment. The memory drive storage tray 100 includes a frame 110 and a plurality of partitions 116 defining a plurality of drive bays 112. Each drive bay has a front end portion 113, a rear end portion 115, a bottom wall 117, and an open top. Each drive bay 112 also includes an associated drive connector 120 at the front end portion 113 that connects to a memory drive, such as a 3.5 inch HDD (not shown). The drive bays 112 include retainer tabs 122 and drive bay covers 114 to hold memory drives in position within the drive bays 112. In some embodiments, the rear end portion 115 includes slots 124 that mate with the drive bay covers 114. The drive bay covers 114 rotate open (see arrow A) to allow insertion of an HDD. However, in some applications it is difficult to open the drive bay covers 114 because obstructions, such as cable 10, are present in the server rack containing the memory drive storage tray 100. In these applications, the drive bay covers 114 can be removed and HDDs and SSDs can be retained in the drive bays 112 with the retainers and adapters described below.

Figure 2:
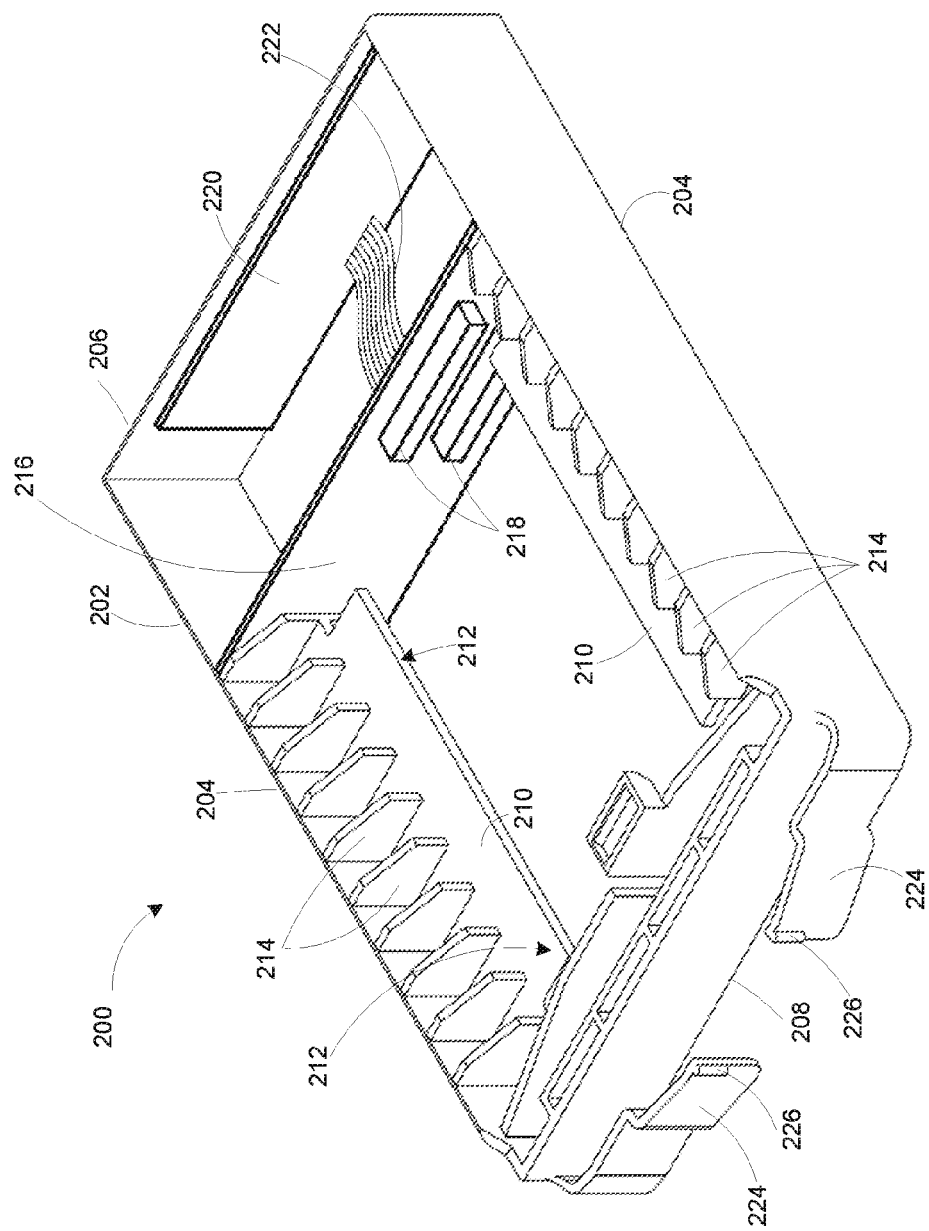
FIG. 2 is an isometric view of a memory drive adapter according to a representative embodiment.

The memory drive adapter 200 shown in FIG. 2 is configured to adapt two 2.5 inch SSD memory devices into a 3.5 inch HDD drive bay. In other words, the memory drive adapter 200 is configured to adapt memory drives for insertion into a drive bay that is larger than the memory drives. The memory drive adapter 200 includes an adapter frame 202 having an envelope compatible with the drive bay, such as drive bay 112 (FIG. 1). The adapter frame 202 includes an end wall 206 and a front wall 208 with a pair of sidewalls 204 extending therebetween. A pair of spaced apart ledges 210 extend from the sidewalls 204 and divide the frame 202 into two memory drive locations 212. Each memory drive location 212 is sized to receive a memory drive, such as an SSD drive. One or more spacers 214 are positioned on or adjacent to the ledges 210 and sized to define the width of the memory drive locations 212 for receiving the memory drives.

The illustrated adapter frame 202 includes a pair of spring arms 224 extending from the front wall 208. The spring arms 224 are deflectable biasing members configured to engage and press against a divider at the rear end portion 115 of the drive bay 112 (FIG. 1), such that the spring arms 224 are operative to maintain a force against the adapter frame 202. Accordingly, the spring arms 224 urge the adapter frame 202 toward the drive bay connector 120 of drive bay 112 (FIG. 1). In some embodiments, the spring arms 224 include tabs 226 for engaging slots 124 formed in the rear end portion 115 of the drive bay 112 (FIG. 1). The end wall 206 of adapter frame 202 can be positioned under the retaining tab 122 of the drive bay 112 (FIG. 1).

Figure 3:
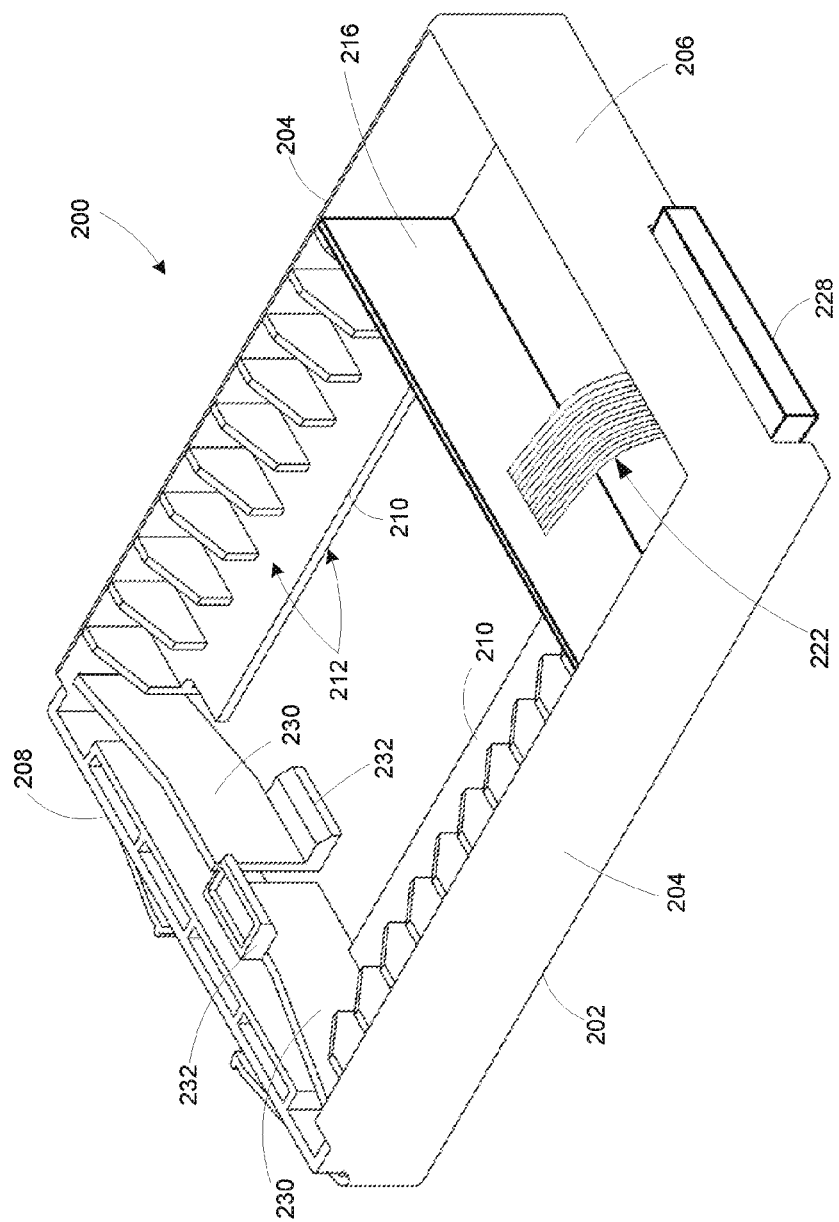
FIG. 3 is an isometric view of the memory drive adapter show in FIG. 2 as viewed from the back.

The memory drive adapter 200 also includes a pair of memory drive connectors 218 each positioned adjacent to a corresponding memory drive location 212. The memory drive connectors 218 are mounted to a divider 216 extending between the sidewalls 204. In the illustrated embodiment, the divider 216 is a printed circuit board (PCB), although other dividers can be used in other embodiments. One or more cables 222 connect the connectors 218 to an adapter 220 mounted to the end wall 206. With further reference to FIG. 3, an adapter connector 228 is mounted on the adapter 220 (FIG. 2) and is thereby electrically connected to the memory drive connectors 218 (FIG. 2). The adapter connector 228 is positioned on the adapter frame 202 for connection with an associated drive bay connector, such as connector 120 of the drive bay 112 (FIG. 1).

The adapter frame 202 includes a pair of latch arms 230 extending from the sidewalls 204. The latch arms 230 are deflectable relative to the front wall 208 and each configured to engage a corresponding memory drive (not shown) positioned in a corresponding memory drive location 212 to urge it rearward so as to maintain a force against the memory drive, thereby urging the memory drive toward a corresponding one of the pair of memory drive connectors 218 (FIG. 2). Each latch arm 230 includes a retainer tab 232 to hold the corresponding memory device against the ledges 210. The retainer tabs 232 also facilitate deflecting the latch arms 230 toward the front wall 208 for insertion of memory devices into the memory drive locations 212. In at least one alternative embodiment, one or more latch arms can be connected to the front wall 208. In some embodiments, the latch arms can be integrally connected to the sidewalls 204 and/or the front wall 208.

Figure 4:
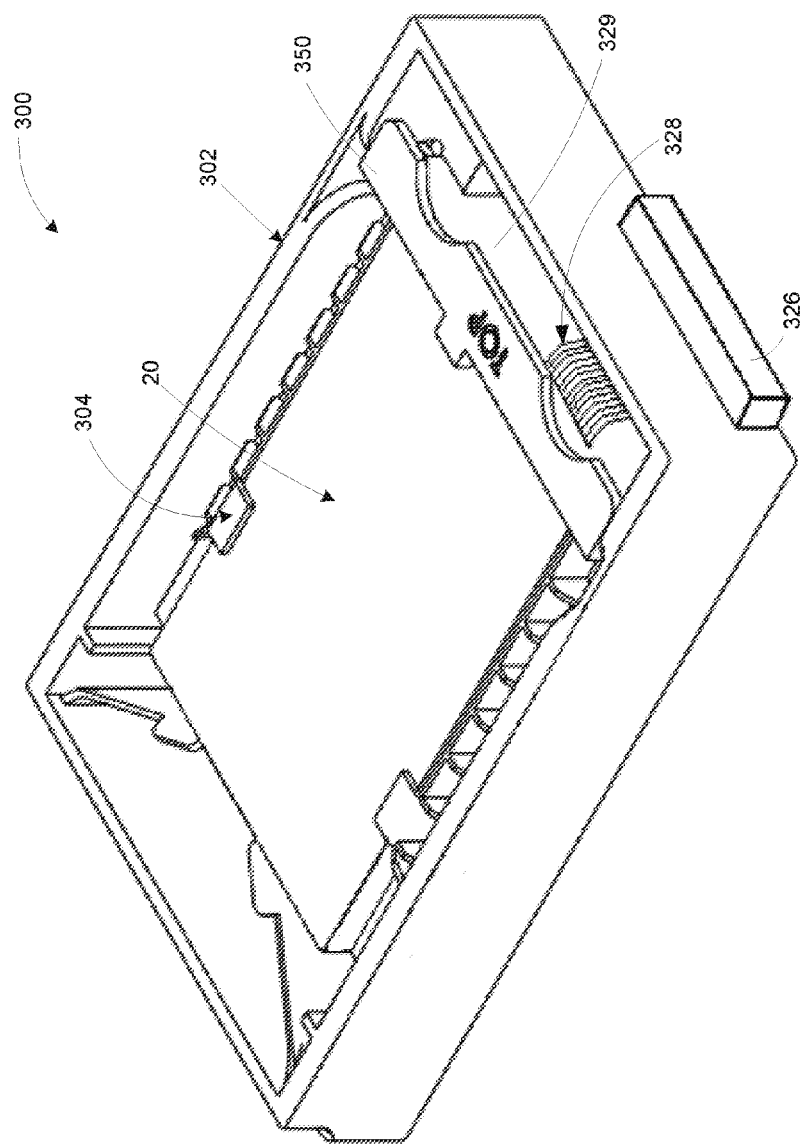
FIG. 4 is an isometric view of a memory drive adapter containing a memory drive according to another representative embodiment having a pivoting drive carrier.

FIG. 4 illustrates a memory drive adapter 300 according to another representative embodiment. Memory drive adapter 300 is configured to adapt two 2.5 inch SSD memory drives to fit into a 3.5 inch HDD memory bay such as drive bay 112 (FIG. 1). The memory drive adapter 300 includes an adapter frame 302 and a memory carrier 304 sized and configured to fit in the adapter frame 302. The illustrated memory carrier 304 is configured to hold a pair of SSD memory drives 20. The adapter frame 302 supports an adapter connector 326 positioned on the adapter frame 302 for connection with an associated drive bay, such as connector 120 of drive bay 112 (FIG. 1). The adapter connector 326 is connected via a flexible cable 328 to a PCB 329 disposed on a divider 350 of the memory carrier 304.

Figure 5:
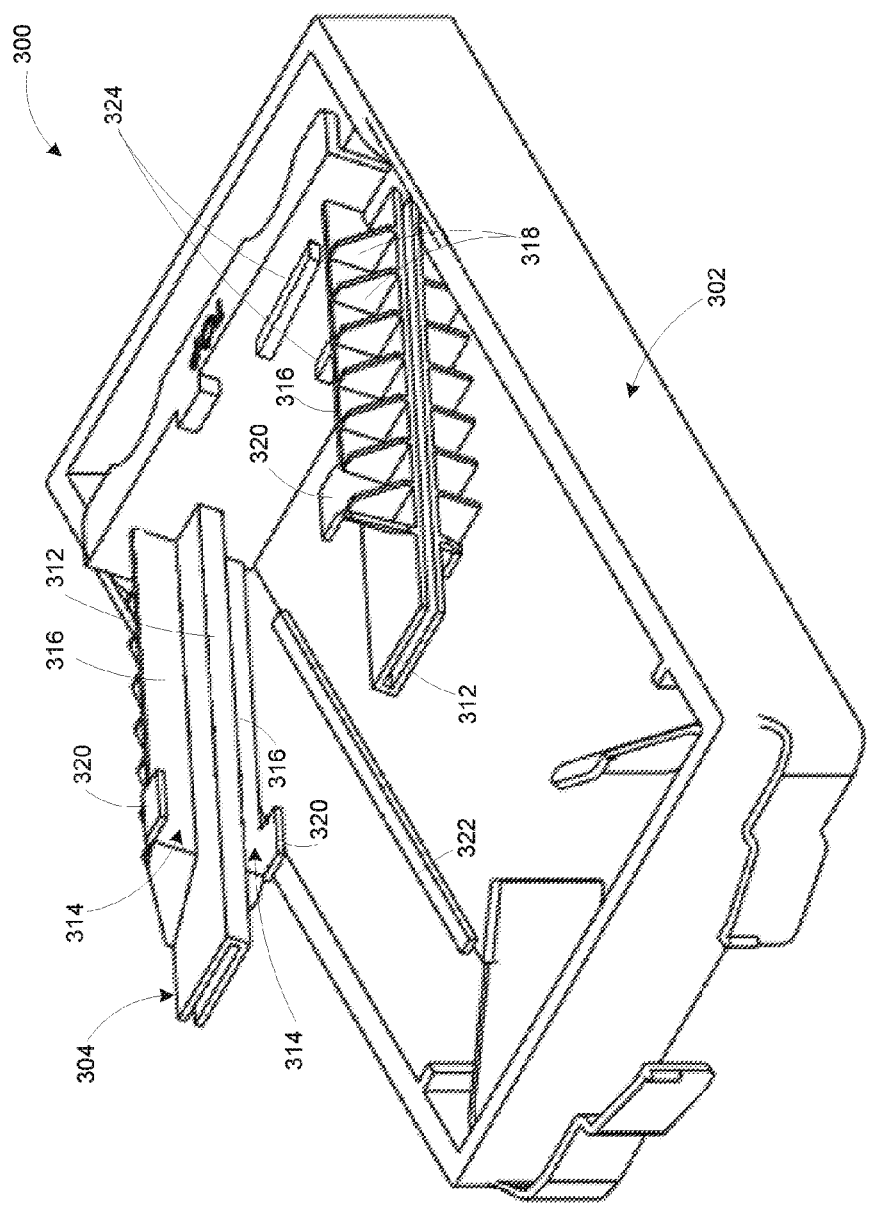
FIG. 5 is an isometric view of the memory drive adapter shown in FIG. 4 with the memory carrier in a load position prior to insertion of the memory drive.

With further reference to FIG. 5, a pair of memory drive connectors 324 are mounted on the PCB 329 (FIG. 4) for connection to the SSD memory drives 20. As explained more fully below, the memory carrier 304 is pivotably connected to the adapter frame 302 and movable to a load position that facilitates insertion of memory drives into memory drive locations 314 without interference by the adapter frame 302. The memory carrier 304 includes a pair of spaced apart ledges 312 dividing the memory carrier into the two memory drive locations 314. Each memory drive location 314 is sized to receive a memory drive, such as a 2.5 inch SSD drive. Each ledge 312 includes a pair of sidewalls 316 each corresponding to a memory drive location 314. Each sidewall 316 is supported by a plurality of ribs 318. Each memory drive location 314 also includes a retainer tab 320 attached to the sidewall 316 and spaced apart from the ledge 312 so as to retain the SSD in its location. Accordingly, the SSD can be slid axially along the ledges 312, under the retainer tabs 320 toward or away from the memory device connectors 324, when the memory carrier 314 is in the load position (FIG. 5). The memory carrier 304 is rotatable between the load position and a storage position such as shown in FIG. 4. When in the storage position, the bottom ribs 318 of the memory carrier 304 are positioned to rest against ledges 322 extending inwardly from the sidewalls 306 of the adapter frame 302 so as to support the memory carrier 304 within the adapter frame 302 when in the storage position.

Figure 6:
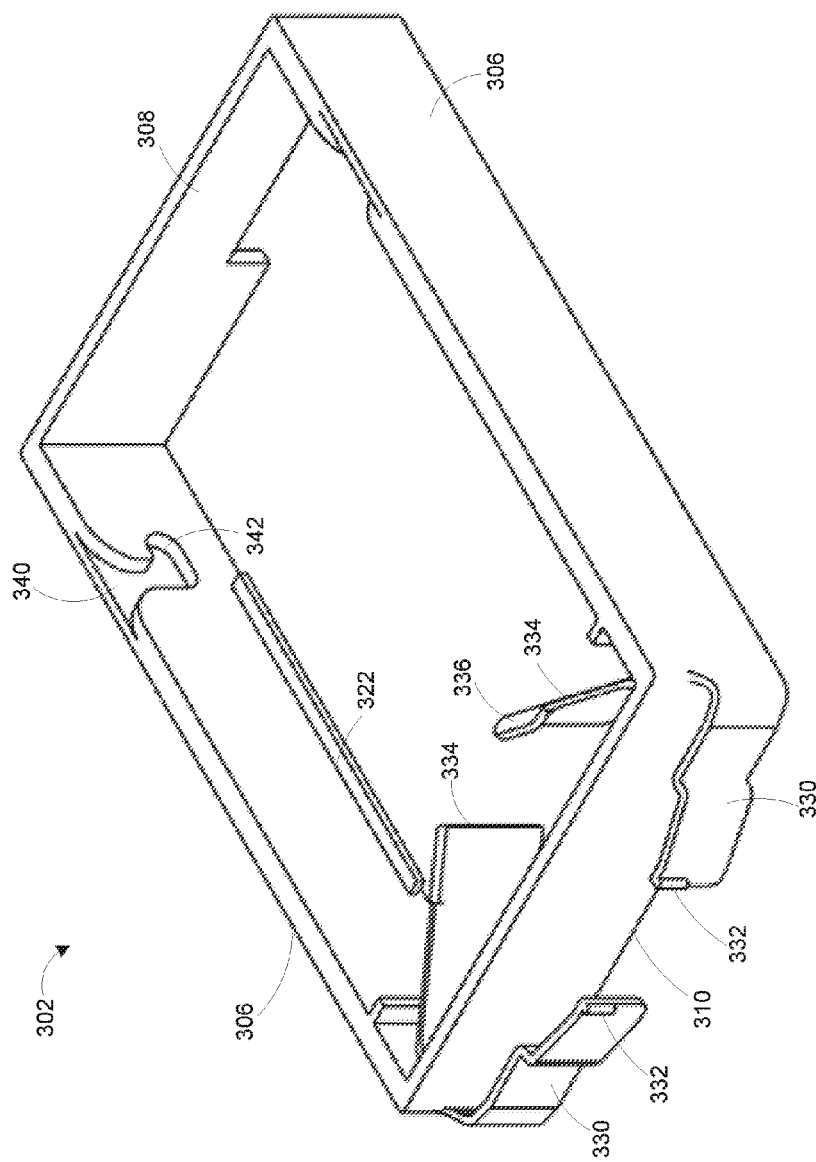
FIG. 6 is an isometric view of the adapter frame shown in FIGS. 4 and 5.

As shown in FIG. 6, the adapter frame 302 includes an end wall 308, a front wall 310, and a pair of sidewalls 306 extending therebetween. A pair of spring arms 330 extend from the adapter frame front wall 310. The spring arms 330 are deflectable biasing members configured to engage and press against a wall at the rear end portion 115 of the drive bay 112 (FIG. 1), such that the spring arms 330 are operative to maintain a force against the adapter frame 302. Accordingly, the spring arms 330 urge the adapter connector 326 (FIG. 4) toward the drive bay connector 120 (FIG. 1). In some embodiments, each spring arm 330 includes a tab 332 configured to engage a slot 124 in the drive bay 112 (FIG. 1). In some embodiments, a pair of latch arms 334 extend from the front wall 310 toward the memory carrier 304 (FIG. 5) and are operative to maintain a force against the memory drives positioned in the two memory drive locations 314 (FIG. 5), thereby urging the one or more memory drives toward the memory drive connectors 324 (FIG. 5). In some embodiments, the latch arms 334 include tabs 336 to facilitate manually deflecting the latch arms 334 toward the front wall 310 for insertion of memory drives into the memory drive locations 314 (FIG. 5) and/or rotating the memory carrier 304 into the load position (FIG. 5).

Figure 7:
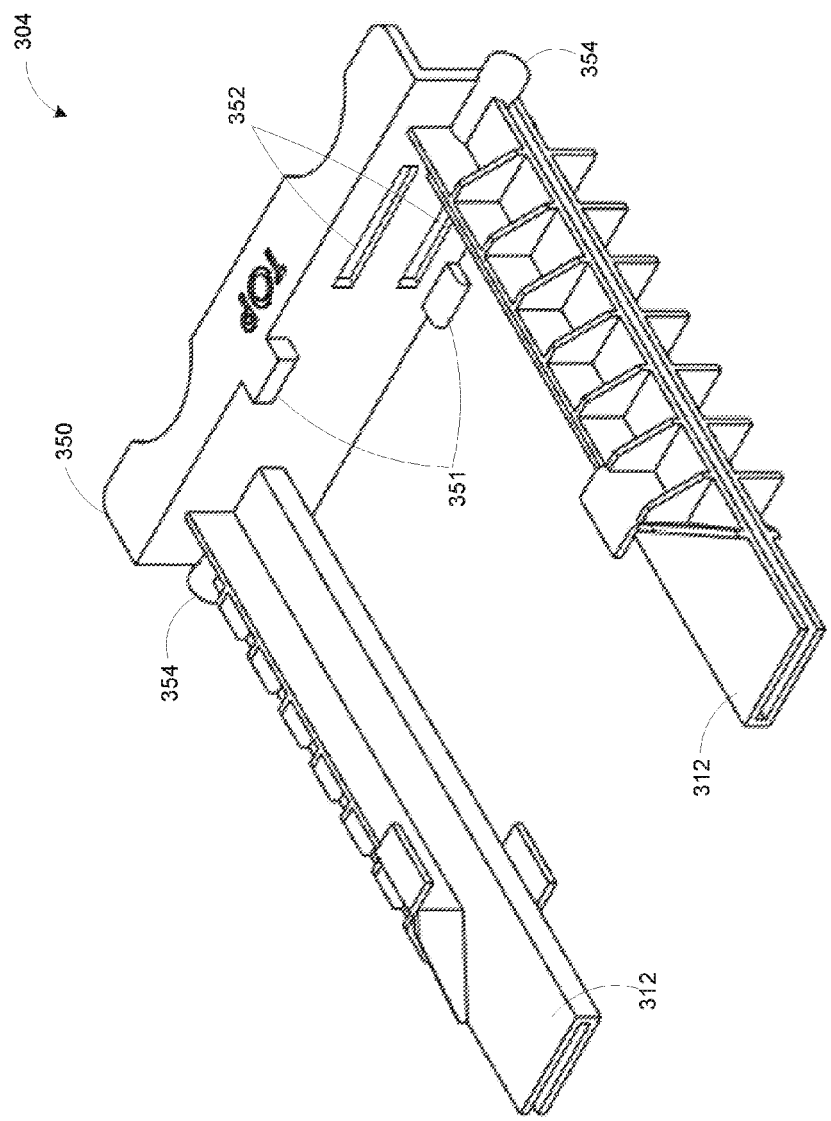
FIG. 7 is an isometric view of the memory carrier of FIGS. 4 and 5 shown removed from the adapter frame.

Each sidewall 306 has a pivot portion that receives portions of the memory carrier 304 to facilitate rotation of the memory carrier 304 (FIG. 5) relative to the adapter frame 302. In the illustrated embodiment, the pivot portion is provided by a slot 340 formed in the respective sidewall 306. Each slot 340 includes a dog leg portion 342 configured to retain the memory carrier in position when the latch arms 334 urge the memory drive carrier 304 (FIG. 5) toward the end wall 308. With further reference to FIG. 7, the memory drive carrier 304 includes a pair of pins 354 extending from opposite sides of the memory carrier 304. Each pin 354 is configured to engage a corresponding one of the pair of slots 340 (FIG. 6), whereby the memory carrier 304 pivots with respect to the adapter frame 302 (FIG. 6) between the load and storage positions. As shown in FIG. 7, the spaced apart ledges 312 extend from the divider 350 of the memory carrier 304. Divider 350 also includes a pair of apertures 352 through which the connectors 324 (FIG. 5) extend. The divider 350 also includes a pair of retainer tabs 351 to further facilitate retaining the SSD drives in the memory carrier 304.

Figure 8:
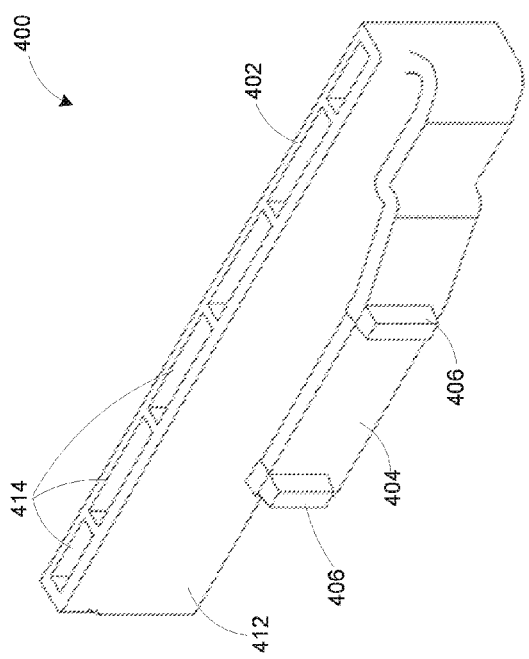
FIG. 8 is an isometric view of a hard disc drive retainer according to a representative embodiment.
Figure 9:
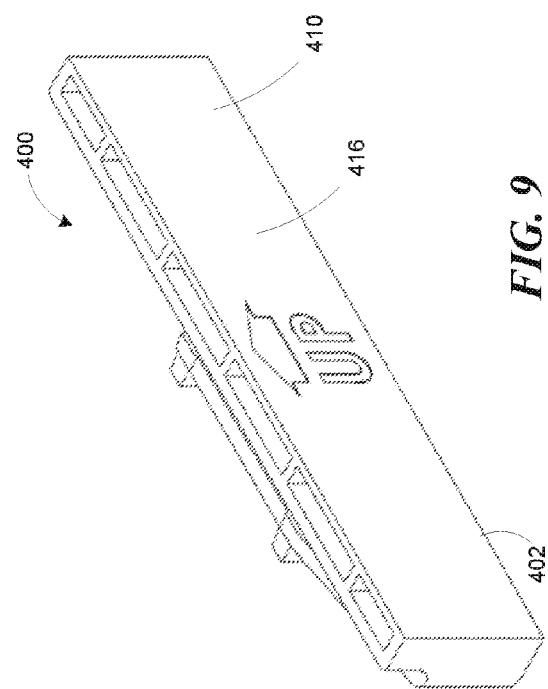
FIG. 9 is an isometric view of the hard disc drive retainer shown in FIG. 8 as viewed from the back.

The above described adapters are suitable for use when adapting SSDs to fit in HDD drive bays. When HDDs are to be inserted in HDD drive bays, no adapter is needed. However, a low profile retainer can be used in applications where it is difficult to open the drive bay covers 114 (FIG. 1) due to obstructions present in the server rack. Disclosed herein is a low profile hard disc drive retainer 400, as shown in FIGS. 8 and 9. The hard disc drive retainer 400 includes a spacer body 402 configured to confront an end of a HDD, such as a 3.5 inch HDD. One or more spring arms 404 extend from the spacer body 402 and are operative to maintain a force against the hard disc drive thereby urging the hard disc drive towards the drive bay connector, such as drive bay connector 120 of drive bay 112 (FIG. 1). At least one tab 406 is disposed on the one or more spring arms 404 for engaging a slot 124 in the drive bay 112. The spacer body 402 has a first surface 410 to confront the hard disc drive and an opposed second surface 412 from which the spring arm 404 extends. A plurality of openings 414 are positioned between the first and second surfaces 410 and 412 respectively. Openings 414 reduce the amount of plastic necessary to form the hard disc drive retainer 400. In some embodiments, an adhesive strip 416 can be positioned on the first surface 410 to attach the retainer 400 to the end of the HDD.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A memory drive adapter usable with memory drives for insertion into a drive bay that is larger than the memory drives, the memory drive adapter comprising:

an adapter frame having an envelope compatible with the drive bay and a pair of spaced apart ledges dividing the frame into two memory drive locations, each sized to receive a memory drive;

a pair of memory drive connectors, each positioned adjacent a corresponding memory drive location;

an adapter connector electrically coupled to the pair of memory drive connectors and positioned on the adapter frame for connection with an associated drive bay connector of the drive bay; and one or more biasing members extending from the adapter frame and operative to maintain a force against the adapter frame such that the one or more biasing members urges the adapter frame toward the drive bay connector, wherein:

the one or more biasing members comprises a deflectable spring arm.

2. The memory drive adapter of claim 1, further comprising at least one tab disposed on the one or more biasing members for engaging a sidewall of the drive bay opposite the drive bay connector.

3. The memory drive adapter of claim 1, further comprising one or more latch arms extending from the adapter frame and operative to maintain a force against one or more memory drives positioned in a respective one of the two memory drive locations, thereby urging the one or more memory drives toward a respective one of the pair of memory drive connectors.

4. The memory drive adapter of claim 1, wherein the envelope is sized to be compatible with a 3.5 inch hard disc drive (HDD) drive bay.

5. The memory drive adapter of claim 1, wherein the memory drive locations are sized to receive 2.5 inch solid state drives (SSD).

6. The memory drive adapter of claim 1, further comprising one or more cables extending between the adapter connector and the pair of memory drive connectors.

7. A memory drive adapter usable with memory drives for insertion into a drive bay that is larger than the memory drives, the memory drive adapter comprising:
   an adapter frame having an envelope compatible with the drive bay, and the adapter frame having a pair of spaced apart sidewalls each including a pivot portion;
   a memory carrier sized and configured to fit in the adapter frame, including:
      pins extending from opposite sides of the memory carrier, each pin configured to engage a corresponding one of the pivot portions, such that the memory carrier pivots with respect to the adapter frame;
      a pair of spaced apart ledges coupled to the sidewalls and defining at least one memory drive location sized to receive a memory drive;
      at least one memory drive connector, positioned adjacent the at least one memory drive location; and
   an adapter connector electrically coupled to the at least one memory drive connector and positioned on the adapter frame for connection with an associated drive bay connector of the drive bay; and
   one or more biasing members extending from the adapter frame and operative to maintain a force against the adapter frame such that the one or more biasing members urges the adapter frame toward the drive bay connector, wherein:
   the one or more biasing members comprises a deflectable spring arm.

8. The memory drive adapter of claim 7, wherein the envelope is sized to be compatible with a 3.5 inch hard disc drive (HDD) drive bay.

9. The memory drive adapter of claim 7, wherein the at least one memory drive location is sized to receive 2.5 inch solid state drives (SSD).

10. The memory drive adapter of claim 7, further comprising at least one tab disposed on the one or more biasing members for engaging a slot in the drive bay.

11. The memory drive adapter of claim 7, further comprising one or more latch arms extending from the adapter frame and operative to maintain a force against one or more memory drives positioned in the at least one memory drive location, thereby urging the one or more memory drives toward the at least one memory drive connector.

12. The memory drive adapter of claim 7, further comprising a cable extending between the adapter connector and the at least one memory drive connector.

13. The memory drive adapter of claim 7, wherein each pivot portion comprises a slot.

14. A hard disc drive (HDD) retainer for retaining a HDD in a drive bay, the HDD retainer comprising:
   a spacer body configured to confront an end of a HDD;
   one or more biasing members extending from the spacer body and operative to maintain a force against the HDD such that the one or more biasing members urges the HDD toward a drive bay connector associated with the drive bay; and
   at least one tab disposed on the one or more biasing members for engaging a sidewall of the drive bay opposite the drive bay connector, wherein:
   the one or more biasing members comprises a deflectable spring arm.

15. The HDD retainer of claim 14, wherein the at least one tab is configured to engage a notch formed in the sidewall of the drive bay.

16. The HDD retainer of claim 14, wherein the spacer body and the one or more biasing members comprise molded plastic.

17. The HDD retainer of claim 14, further comprising an adhesive strip positioned on the spacer body for attachment to the HDD.

* * * * *